March 29, 1960 R. D. HIRDLER 2,930,976
CAPACITANCE METHOD AND APPARATUS FOR GAGING HOLE CENTERS
Filed May 31, 1956 3 Sheets-Sheet 1
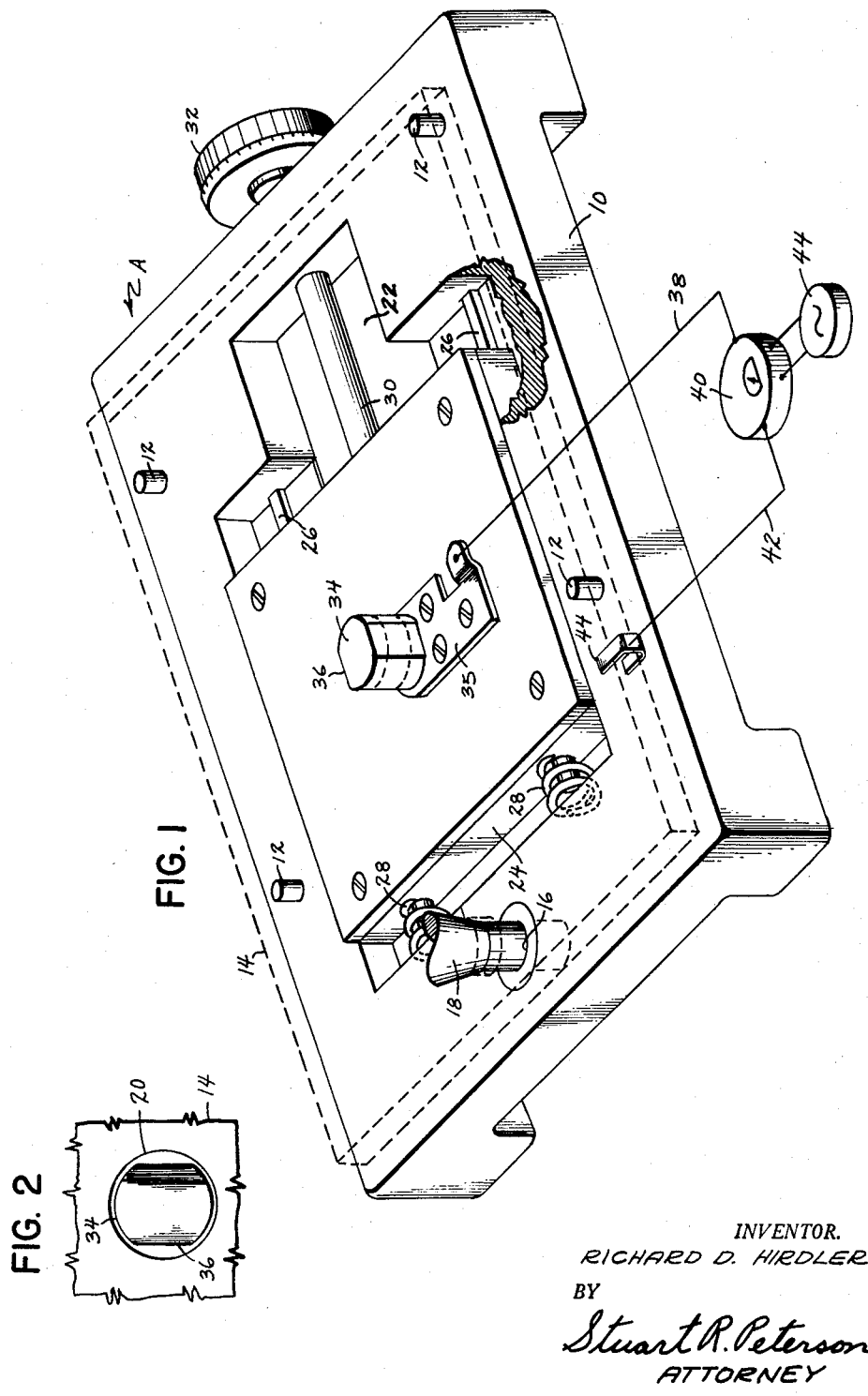
INVENTOR.
RICHARD D. HIRDLER
BY
Stuart R. Peterson
ATTORNEY March 29, 1960 R. D. HIRDLER 2,930,976
CAPACITANCE METHOD AND APPARATUS FOR GAGING HOLE CENTERS
Filed May 31, 1956 3 Sheets-Sheet 2

INVENTOR.
RICHARD D. HIRDLER
BY
Stuart R. Peterson
ATTORNEY

March 29, 1960 R. D. HIRDLER 2,930,976
CAPACITANCE METHOD AND APPARATUS FOR GAGING HOLE CENTERS
Filed May 31, 1956 3 Sheets-Sheet 3

INVENTOR.
RICHARD D. HIRDLER
BY
Stuart R. Peterson
ATTORNEY

United States Patent Office 2,930,976
Patented Mar. 29, 1960

2,930,976
CAPACITANCE METHOD AND APPARATUS FOR GAGING HOLE CENTERS

Richard D. Hirdler, Long Beach, Calif., assignor to General Mills, Inc., a corporation of Delaware Application May 31, 1956, Serial No. 588,479

11 Claims. (Cl. 324—61)

This invention relates generally to the art of gaging metal work and pertains more particularly to a method and apparatus for locating hole centers and/or the distance between two hole centers.

One object of the invention is to provide a method and apparatus for locating the true centers of holes or determining the distance between the centers of two holes in a very accurate and precise manner. For example, it is within the purview of the invention to locate the hole center within 0.00002 of an inch. More specifically, it is contemplated that a capacitance relationship be ascertained which is indicative of when a sensing rod has been moved to a central position within the hole of a metallic member. Further, it is planned that there be included in the apparatus certain micrometer means by which the distance between hole centers can be measured.

Another object of the invention is to provide a method and apparatus that is not dependent upon having the hole extend completely through a member for in practicing the instant invention it is entirely practical to determine the center of a bottomed hole.

A further object of the invention is to provide a method and apparatus of the foregoing character that is exceedingly simple in its construction and use, such apparatus being easily operated by comparatively unskilled technicians, yet being susceptible of achieving very accurate results.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

Figure 1 is a perspective view of a relatively simple embodiment that the invention may assume, this particular embodiment being adapted to a facile explanation of the principles underlying the invention;

Fig. 2 is a fragmentary plan view illustrating the sensing rod of Fig. 1 in a central position relative to the hole disposed in the plate member which has been depicted only in phantom outline in Fig. 1;

Figure 3:
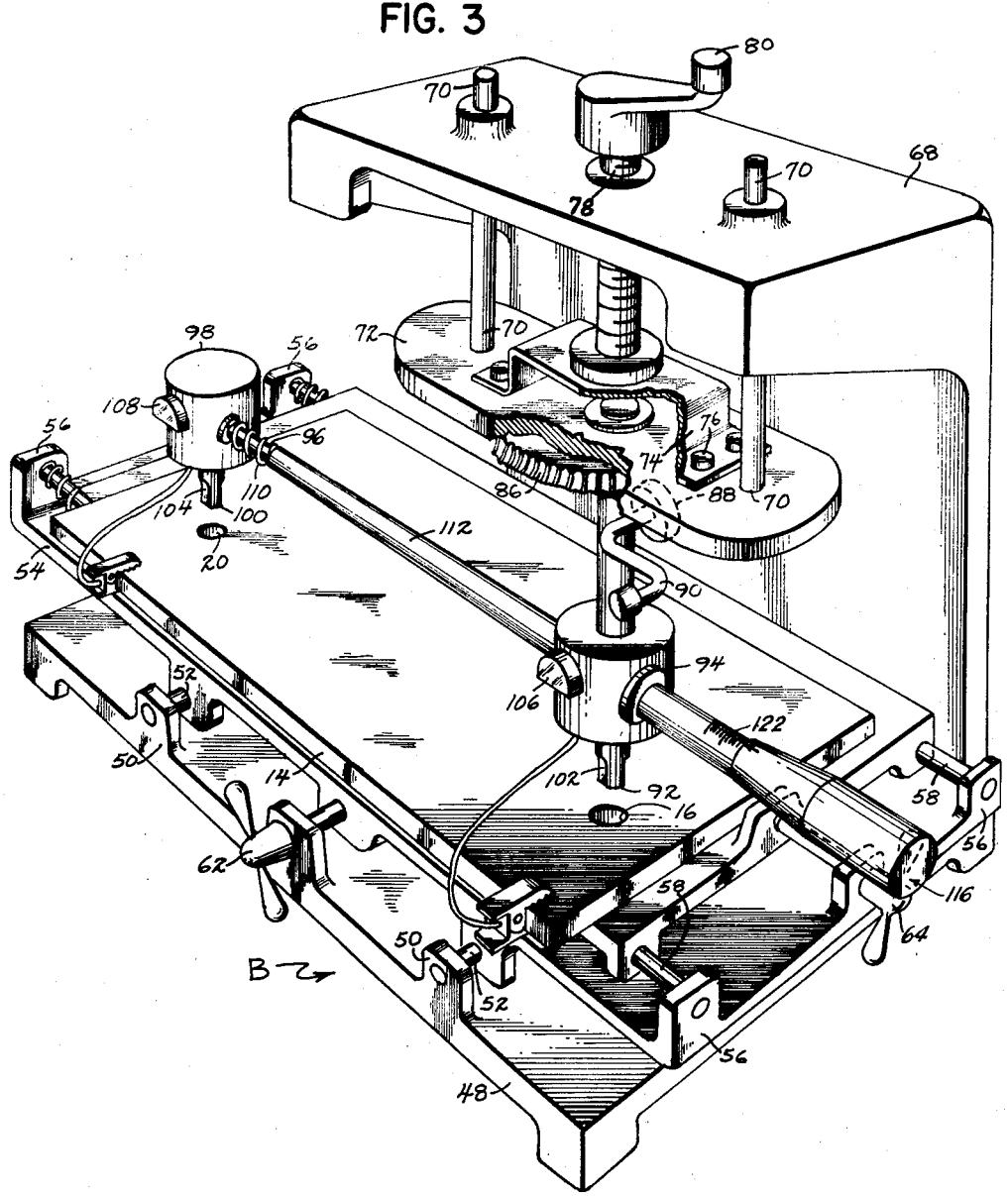
Fig. 3 is a perspective view of a more elaborate embodiment that the invention may assume.

Referring now in detail to the embodiment pictured in Figs. 1 and 2, it will be observed that the modification has been designated in its entirety by the letter A which includes a base plate 10 carrying a plurality of upstanding stud elements 12 on which can rest a metallic plate member denoted by the numeral 14, the plate member (which is the metallic work) being shown in phantom outline so as not to obscure the underlying parts. As exemplified, the left end of the plate 14 has drilled therethrough a hole 16 into which a tapering plug member 18 has been positioned. In this way, the plate member is oriented relative to the hole 16 and for the sake of describing this more basic embodiment we will assume that a second hole 20 is spaced from the first hole 16 and that we desire to locate the true center of this second hole 20 so that the distance between hole centers can therefore be ascertained.

In carrying out the above objective, the base plate 10 is recessed at 22 for the reciprocal accommodation of a slidable plate 24, there being track elements 26 on the base plate 10 for guiding the plate 24 in its reciprocal path. Also it will be noted that a pair of coiled springs 28 located at one end of the recess 22 are instrumental in urging or biasing the plate 24 toward the left. However, a rod 30 threadedly received in the slidable plate 24 is capable of overcoming the aforementioned biasing action of the springs 28 to move the plate 24 to the right. The rod 30 passes through one end of the base plate and is equipped with a micrometer mechanism labelled 32. By reason of the threaded engagement of the rod 30 with the plate 24 it will be appreciated that any movement of the plate 24 is susceptible to measurement by the micrometer mechanism 32.

Carried by the slidable plate 24 in an upstanding relationship therewith is a metallic sensing rod 34 mounted on a terminal 35 which rests upon a layer of dielectric material 36 so as to insure an insulative relationship between the plate 24 and said sensing rod 34. As pictured, it can be seen that the sensing rod 34 has opposite sides 36 which may be flattened, the reason for which will soon become manifest. A conductor 38 is electrically connected to the sensing rod 34 by way of the terminal 35 and has in circuit therewith a capacitance meter 40. While any precision type of capacitance meter may be utilized, it perhaps should be mentioned at this particular time that a Boonton Model 160A Q meter has been found entirely satisfactory. This meter 40 is connected into electrical circuit with the plate member 14 by means of another conductor 42 and a clip element 44 having electrical contact with said plate member 14. The meter 40 is energized from an A.C. source 44.

From the foregoing, the operation of the embodiment A is believed readily understandable. In this regard, it may be pointed out that the plate 14 is first placed on top of the upstanding studs 12 of the base plate 10 and by reason of the tapered plug 18, the center of the hole 16 is determined, in this instance by mechanical means. However, the center of the hole 20 is determined electrically by the previously mentioned capacitance measurement. To this end it will be appreciated that the sensing rod 34 extends upwardly within said hole 20 and by way of the micrometer mechanism 32 the slidable plate 24 may be reciprocably moved so that the sensing rod 34 is brought to the center of this particular hole 20. While no provision is made for moving the sensing rod 34, in this instance, other than toward and from the plug 18, nonetheless it will be appreciated that a high degree of accuracy is obtained without movement in intersecting directions, for the sides of the sensing rod 34 have been flattened at 36 thereby creating a larger air gap with respect to the side walls of the hole 20 adjacent these flattened slides 36. Hence if care has been exercised in the placing of the plate 14 on top of the base plate 10, then all that one has to do is to actuate the micrometer mechanism 32 and note the reading of the meter 40. As earlier explained, the meter 40 is a Q meter so its maximum reading is looked for while adjusting the micrometer mechanism. This maximum reading will, of course, denote a minimum capacitance relationship between the sensing rod 34 and the side walls of the hole 20. Once such a condition has been reached, then all that the operator has to do is to read the micrometer mechanism and the reading will be the distance between the centers of the holes 16 and 20. In this regard, however, it should be mentioned that the micrometer mechanism 32 is initially calibrated so that it reads with respect to the center of the hole 16.

Thus it will be discerned that a mechanical method is utilized in the embodiment A in order to locate the center of the first hole whereas an electrical arrangement is resorted to in determining the center of the second hole. By measuring the distance between the two hole centers, one obtains a true indication of the actual distance between hole centers. If only the center of the hole 20 is desired, then it will be obvious, it is thought, that it would be best to not flatten the sides of the sensing rod 34, leaving the rod 34 in the form of a cylinder. By so doing, then when a true hole center has been established, the rod 34 will be located so that there will be an approximately equal air gap circumjacent thereto and of course the capacitance relationship will be at a minimum. A subsequent reference to Fig. 5 will serve to clarify this point.

Figures 4, 5:
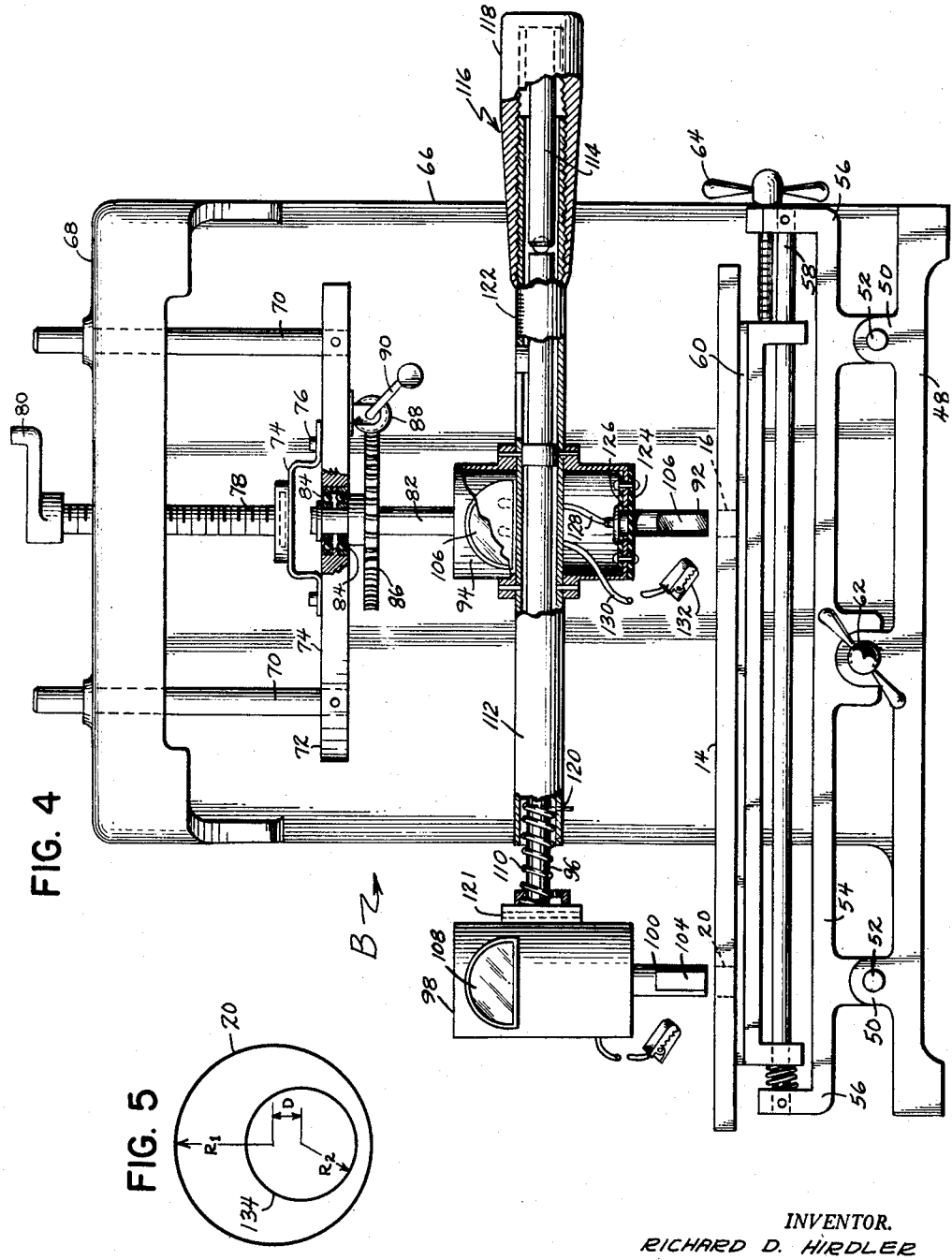
Fig. 4 is an elevational view corresponding to Fig. 3.
Fig. 5 is a schematic representation of the outline of a hole with the sensing rod located therein, the displacement from a true central position being somewhat exaggerated in order to show by suitable letter characters the relative distances involved in the process of deriving a true hole center.

In Figs. 3 and 4 a more elaborate embodiment B is presented. In this embodiment it will be observed that a base plate 48 is equipped with a plurality of upstanding ears 50, these ears supporting transverse guide rods 52. It is along these guide rods that a first or lower carriage 54 may be moved and this lower carriage 54 is equipped with a plurality of upstanding ears 56 supporting similar guide rods 58 extending in a direction normal to the lower rods 52. Slidably mounted on these upper guide rods 58 is a carriage 60 which supports the plate 14, it being assumed that the plate is identical with the earlier mentioned plate described in conjunction with embodiment A. The plate 14, in this instance, is depicted in solid outline, though. Hence it will be recalled that this plate has a pair of apertures 16 and 20 drilled therein. For the purpose of actuating the carriage 54 in one rectilinear direction, there is utilized a threaded jacking arrangement 62 and for the purpose of actuating the carriage 60 in a direction normal to the direction in which the lower carriage 54 is constrained to move, there is a second threaded arrangement 64.

From the preceding description, it is believed apparent that the described structure constituting the embodiment B, as thus far described, permits the plate 14 to be moved in two intersecting directions inasmuch as the lower carriage 54 moves in one direction and the upper carriage 60 moves in a direction at right angles thereto.

Continuing with the description of the embodiment B, it will be noted that the rear edge of the base plate 48 has an upstanding panel 66 equipped with what might be termed a horizontally extending hood or plate 68. The hood or plate 68 is apertured for the sliding accommodation of a pair of vertical guide rods 70 having secured to their lower ends a horizontal platform member 72. By reason of a U-shaped bracket 74 secured to the platform member by means of a plurality of bolts 76 the platform member may be moved vertically any desired amount. The bracket 74 serves as a journal for the lower end of a threaded rod 78. The rod 78 extends upwardly through a threaded aperture in the plate or hood 68 and by reason of a crank element at the top of the rod 78, this rod may be conveniently rotated so as to raise and lower the platform member 72.

Depending from the platform member 72 is a vertical swivel post 82, this post being journalled for rotation by means of a pair of bearings 84 (Fig. 4). In order to rotate the post 82, however, there is mounted on the post 82 a worm gear 86 enmeshed with a worm 88. By means of a crank element 90, the worm 88 may be rotated and hence the worm gear 86 is caused to rotate, thereby imparting rotative movement to the vertical rod 82.

The vertical post 82, capable of being rotated as above outlined, supports a first metallic sensing rod 92, this sensing rod 92 extending downwardly from a cylindrical casing 94. Projecting radially from the casing 94 is a horizontal arm 96 carrying at the free end thereof a similar cylindrical casing 98. Extending downwardly from the second casing 98 is an additional metallic sensing rod 100. As can be seen from Fig. 3, each of these sensing rods may have flattened sides at locations designated by the numerals 102 and 104, respectively. Further, as was the situation with respect to embodiment A, the present embodiment envisages the utilization of appropriate capacitance meters and in this regard it will be observed that the casing 94 is equipped with a meter 106 similar to the previously described meter 40, and the cylindrical casing 98 has associated therewith a meter 108, both of which meters are suitably energized (sources not shown).

As best viewed in Fig. 4, it can be seen that the horizontal arm 96 has circumscribed about a portion thereof a coil spring 110 serving to bias the arm radially outwardly inasmuch as this coil spring bears against one end of a horizontally extending tubular member integral with the cylindrical casing 94. The horizontal arm 96 is rendered reciprocal within the tube 112 and it can be seen (Fig. 4) that it extends completely through the casing 94 and has bearing thereagainst an actuating rod 114 which is carried by part of a micrometer mechanism 116, the micrometer mechanism including a cylindrical cap 118 by which the rod 114 is engaged pressurally against the right end of the arm 96 so as to overcome the biasing action of the coil spring 110. With especial respect to the coil spring 110, it may be explained that this coil spring has a pinned conection at 120 with the tube 112 and at 121 with the casing 98 so that the movement of the arm at 96 to the left as viewed in Fig. 4 will cause the spring 110 to be placed under tension. This occurs when the cylindrical cap 118 causes the rod 114 to push against the arm 96 to move it to the left. It will also be noted that the micrometer mechanism 116 includes suitable indicia 122 so that the degree of movement of the arm 96 can be readily determined and as will soon be made clear, it is this reading of the indicia 122 that will indicate the actual distance between the hole centers of this embodiment B.

As can be seen to best advantage in Fig. 4, the sensing rod 92 is suitably insulated from the casing 94 as by layers of dielectric material 124 and 126. Within the casing 94 there is a conductor 128 leading to the meter 106 and the meter is also in circuit with a second conductor 130 leading to a clip 132 which is intended to engage the metallic plate 14. As with the earlier described embodiment A, this modification B involves the supplying of electric power for the energization of the meters 106, 108, as already mentioned.

Owing to the elaborateness of the embodiment B, its operation is considerably more involved than the operation necessary with respect to embodiment A. In this regard, it should be explained that in starting a hole-determining operation, the plate 14 is placed upon the upper carriage 60 and it is by reason of the two threaded arrangements 62 and 64 that the hole 16 is brought into a central location beneath the sensing rod 92. This first step is only an approximation, for once there has been fairly good alignment established between the hole 16 and the sensing rod 92 the arm 96 is extended by actuating the micrometer mechanism 116 so that approximate registry of the sensing rod 100 is made with respect to the second hole 20. When sufficient registry has been established between the sensing rods and the holes they are to be inserted in, then the crank 80 is rotated in a direction to lower the platform member 72 and, of course, the rods 92 and 100 so that they are now located into the holes 16 and 20. When this has been done, then the threaded arrangement 62 and 64 can be more precisely moved so that a reading on the meter 106 will give a minimum capacitance relationship between the sensing rod 92 and its associated hole 16. It will be understood, of course, that the threaded arrangement 62 and 64 permits movement of the hole 16 in intersecting directions so that a true central location of the rod 62 can be had with respect to the hole 16.

Once the sensing rod 92 has been centrally located within the hole 16, it is then that a central position of the rod 100 relative to its hole 20 is to be effected. To this end, it will be appreciated that the rod 100 can be swung through an arc merely by rotating the crank element 90, this action causing rotation of the post 82 about its vertical axis. At the same time the micrometer mechanism 116 may be adjusted so as to move the arm 96 radially, thereby obtaining the other of the two intersecting movements possible with said sensing rod 100. Movements of the crank element 90 and the micrometer mechanism 116 are made until the sensing rod 100 is centrally located within its hole 20, this condition being ascertained by the meter 108 giving a minimum capacitance reading. When Q meters are utilized, as was the situation with respect to the meter 40, it will be appreciated that both the meters 106 and 108 will give a maximum reading when this desired minimum capacitance relationship between their respective sensing rods 92 and 100 with their associated holes 16 and 20 is reached.

In summation, then, as far as embodiment B is concerned, it will be noted that the sensing rod 92 is first centrally located by moving the two carriages 54 and 60 relative to each other and after this has been done, then the sensing rod 100 is centrally located within its hole 20 by swinging the arm 96 and also extending it radially.

Attention is now directed to Fig. 5 where the schematic representation there depicted will give certain physical relationships that exist and the electrical characteristics that occur as a result of these physical relationships. Therefore in Fig. 5 it will be observed that the letter $R_1$ is the radius between a true hole center and the side walls of the hole. For instance, we will assume that this particular hole is the hole 20 and therefore this same number has been applied. On the other hand, we will assume that we are now using a circular sensing rod and therefore this new sensing rod has been given the numeral 134. Thus, in this analysis I am not concerned with flattened sides and the radius of the rod 134 has been denoted by the letter $R_2$. Further it may be explained that the letter D represents the off-center distance between the center of the hole 20 and the center of the rod 134. It will, of course, be understood that the sensing rod 134 must be located right at the center of the hole 20 in order to give a minimum capacitance indication. Relative movement of the rod 134 achieves this. In other words D will then be zero.

With the above physical relations in mind, it is interesting to note that the formula for capacitance is:

$$C \text{ micromicrofarad} = \frac{7}{\text{arc cosh} \frac{R_1^2 + R_2^2 - D^2}{2R_1R_2}}$$

Neglecting fringing effects, the capacitance of one centimeter length of the rod 134 in this hole 20 for typical values is given in the table below:

| C, mmfd. | $R_1$, inches | $R_2$, inches | D, inch |
| --- | --- | --- | --- |
| 346.5 | .5000 | .4900 | 0 |
| 348.2 | .5000 | .4900 | .0010 |
| 3500 | .5000 | .4990 | 0 |
| 3517 | .5000 | .4990 | .0001 |
| 66.439 | .5000 | .4500 | 0 |
| 66.451 | .5000 | .4500 | .001 |

From the above table, it will be appreciated that the metallic sensing rod 134 should have a radius approximating the radius of the hole 20 itself. Thus it can be appreciated that when there is a difference of only 0.001 inch, the best capacitance indications are obtained. Consequently as a practical matter, care should be exercised to select a sensing rod having dimensions only slightly less than the hole, the center of which is to be determined.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. A method of determining the distance between two hole centers in a metallic member comprising the steps of locating the center of one hole, laterally shifting a metallic sensing element having slightly smaller dimensions than the second hole within said second hole until a minimum capacitance relation is established, measuring the capacity between said sensing element and the walls of said second hole so as to determine when said minimum capacitance relation is established, and measuring the distance between the one hole center and said sensing element to ascertain the distance between hole centers.

2. A method in accordance with claim 1 in which an additional metallic sensing element is shifted laterally within said one hole until a minimum capacitance relation is established for that one hole, measuring the capacity between said additional sensing eleemnt and the walls of said one hole so as to determine when said minimum capacitance relation is established, and said measuring step includes the measuring of the distance between said sensing elements to ascertain the distance between hole centers.

3. A method of determining the distance between two hole centers in a metallic member comprising the steps of inserting a metallic sensing rod into each of said holes, said sensing rods having dimensions slightly smaller than the holes, moving said rods transversely to the axes of said holes, obtaining an indication of the capacitance between each rod and its hole sides while moving the rods transversely whereby a minimum capacitance indication for each of said holes represents the respective central locations of the rods within the holes, and measuring the distance between the two rods to ascertain the distance between hole centers.

4. Apparatus for determining the distance between two hole centers in a metallic member comprising a support for said member, means for locating the center of one of said holes, means movable relative to said first means including a metallic sensing element shiftable laterally within said second hole, said sensing element having slightly smaller dimensions than said second hole, a capacitance meter for obtaining an indication of the capacitance between the metallic member and said sensing element during said shifting, and means for measuring the distance between said first and second means after minimum capacitance reading has been obtained on said meter.

5. Apparatus for determining the distance between two hole centers in a metallic member comprising a support for said member, a first metallic sensing rod having slightly smaller dimensions than the first hole, means for relatively moving said first sensing rod laterally within said first hole, a capacitance meter for obtaining an indication of the capacitance between the metallic member and said sensing rod during said lateral movement whereby a minimum capacitance indication represents the central location of said sensing rod with respect to the sides of said first hole, a second metallic sensing rod having slightly smaller dimensions than the second hole, means for relatively moving said second sensing rod laterally within said second hole, a capacitance meter for obtaining an indication of the capacitance between the metallic member and said second sensing rod during the lateral movement thereof whereby a minimum capacitance indication of said second rod with respect to said member represents the central location of said second sensing rod with respect to the sides of said second hole, and means for measuring the distance between said sensing rods to determine the distance between hole centers.

6. Apparatus in accordance with claim 5 including means for moving said support in two intersecting directions to locate centrally the first sensing rod within said first hole, and in which the means for relatively moving said second sensing rod includes an arm pivotally mounted for angular movement about the axis of said first sensing rod.

7. Apparatus in accordance with claim 6 in which said last mentioned means is also reciprocal in a radial direction.

8. Apparatus in accordance with claim 7 including means for moving said sensing rods vertically.

9. Apparatus for determining the center of a hole in a metallic member comprising a support for said member, an elongated metallic sensing element, means for advancing and retracting said sensitive element along its longitudinal axis for insertion into and withdrawal from the hole the center of which is to be determined, means for relatively shifting the sensing element with respect to said support in any lateral direction while said sensing element is inserted in said hole, said last mentioned means maintaining the longitudinal axis of said sensing element substantially parallel to the axis of said hole during said shifting, means for applying an A.-C. signal between said metallic member and said sensing element, and means coupled to the metallic member and the sensing element for obtaining an indication of the capacitance between the metallic member and said sensing element during said relative shifting, whereby a minimum capacitance indication respresents the central location of said sensing element with respect to the sides of said hole.

10. Apparatus in accordance with claim 9 in which said sensing element is mounted for movement in two intersecting directions.

11. Apparatus in accordance with claim 9 in which said support is mounted for movement in two intersecting directions.

References Cited in the file of this patent

UNITED STATES PATENTS

| | | |
|---|---|---|
| 2,076,944 | Howe | Apr. 13, 1937 |
| 2,274,735 | Peters et al. | Mar. 3, 1942 |
| 2,425,868 | Dillon | Aug. 19, 1947 |
| 2,512,879 | Roggenstein | June 27, 1950 |

FOREIGN PATENTS

| | | |
|---|---|---|
| 111,790 | Australia | Apr. 17, 1939 |